Patented Sept. 15, 1942

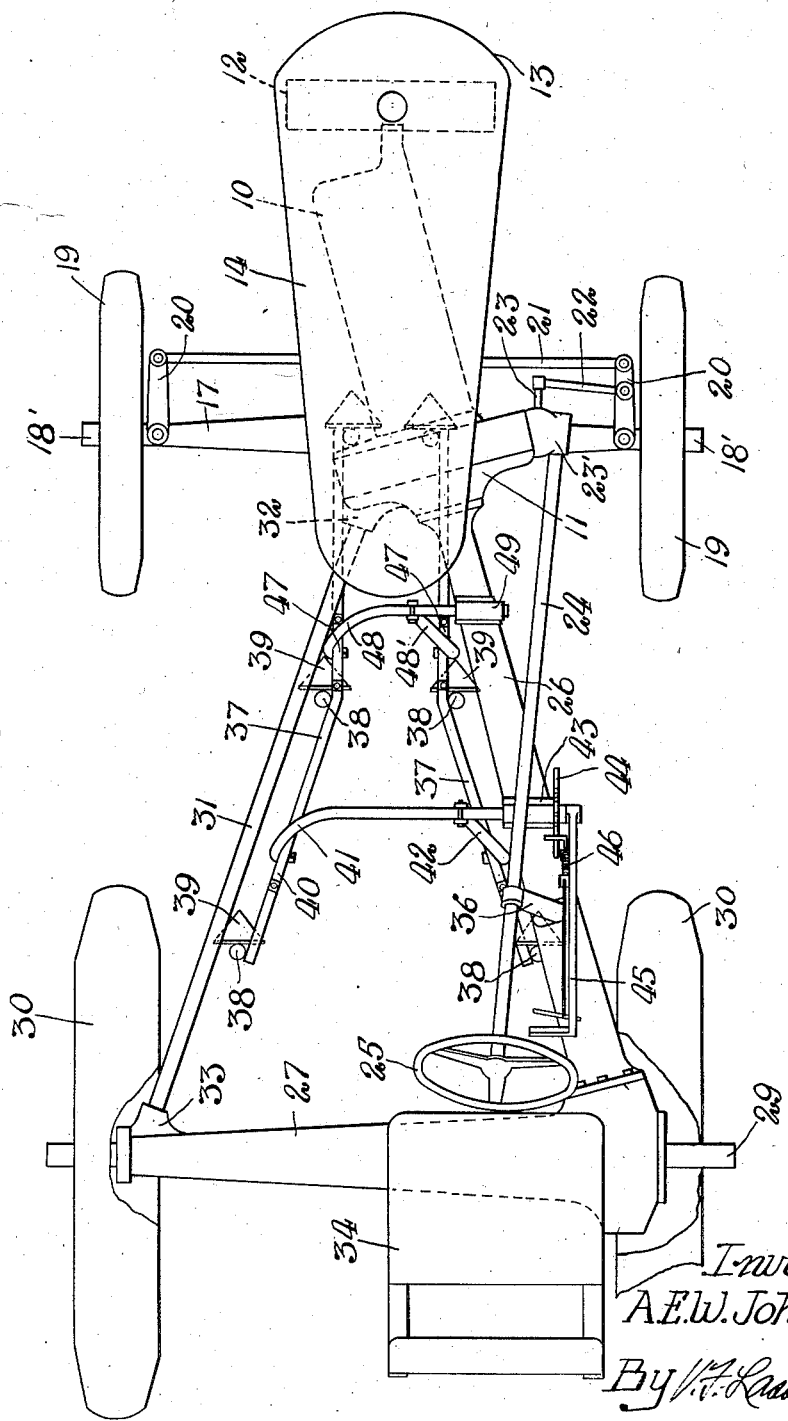

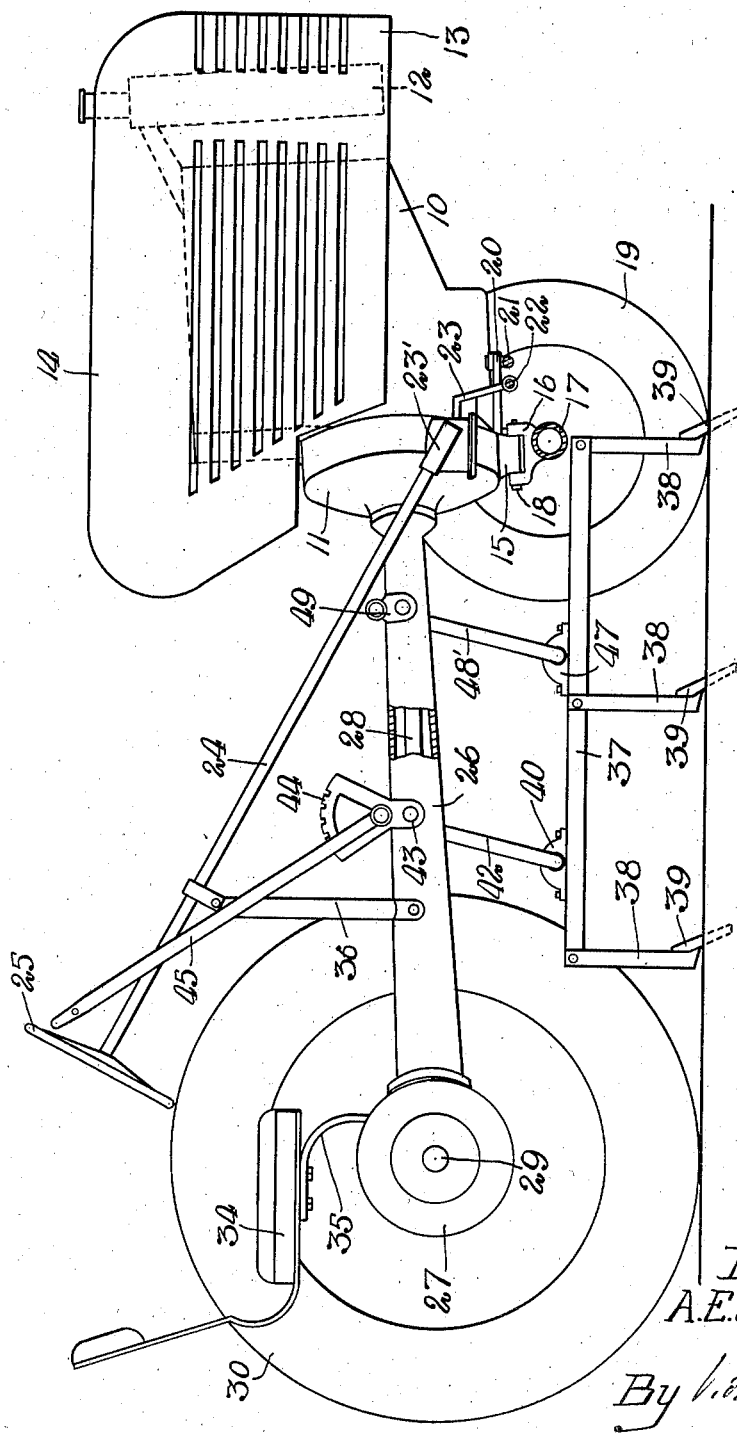

2,296,205

UNITED STATES PATENT OFFICE 2,296,205

TRACTOR

Arnold E. W. Johnson, Chicago, Ill., assignor to International Harvester Company, a corporation of New Jersey Application November 10, 1938, Serial No. 239,751

5 Claims. (Cl. 180—1)

This invention relates to an agricultural tractor. More specifically it relates to a tractor particularly designed for row-crop work.

The principal object of the invention is to construct a tractor to provide for better vision beneath the tractor from an operator's station at the rear of the tractor.

A more detailed object is to provide a frame structure incorporating a driving mechanism and providing a large central area entirely free from obstruction to vision.

These objects and others, which will be apparent from the detailed description to follow, are accomplished by a construction such as shown in the drawings, in which:

Figure 1 is a top plan view of a tractor incorporating the invention, a cultivator being shown attached thereto to better illustrate the adaptability of the tractor for row-crop cultivation; and, Figure 2 is a side elevation of the tractor construction shown in Figure 1.

In the drawings, many of the important elements of the tractor have been shown by outlined drawings as the invention resides in the general combination of parts and not in the particular construction of any of the parts thereof.

A unit engine and crank-case construction 10 is illustrated having an integral fly-wheel housing 11. Said unit construction is conventional practice in tractor design, the crank-case usually being formed as a casting and being of sufficient rigidity to form that portion of the tractor frame construction. A radiator 12 is shown in dotted lines, being enclosed by a front grill 13. The entire engine is enclosed by a hood 14, which is shown in outline. All of the engine accessories may be located within said hood. A downwardly depending boss 15 on the fly-wheel housing 11 provides means for attaching a pivot member 16. Said member is rigidly secured to a transverse front axle 17 and is pivotally secured to the boss 15 for oscillation on a longitudinal axis by a pivot pin 18. Steering axles 18' pivoted on the vertical axes to the end of the axle 17 carry front wheels 19. Forwardly extending steering arms 20 connected to the steering axles 18' are connected by a tie rod 21. A drag link 22 pivotally connected to one of the steering arms 20 is connected to a steering arm 23 for steering the front wheels of the tractor.

A housing 23' rigidly secured to the fly-wheel housing 11 contains a worm type steering gear of a conventional construction, being operated by a steering shaft 24 which extends rearwardly and upwardly to a point adjacent the operator's station at the rear of the tractor. A steering wheel 25 is mounted at the upper end of the shaft 24. The steering arm 23, previously mentioned, is operated by the mechanism within the housing 23'. This construction has not been shown in detail as any of the well known conventional steering mechanisms may be utilized.

A hollow frame member 26 is rigidly secured to the rear of the fly-wheel housing 11 extending rearwardly and angularly to one end of a transverse rear axle structure 27, being rigidly secured thereto. It is to be noted that the engine unit 10 is also located at an angle in the hood 14, being in alinement with the frame member 26. The hood 14 is constructed to lie longitudinally, while the engine enclosed thereby is positioned at an angle. This improves the vision along the hood of the tractor and improves the general appearaance of the tractor. It will be noted that the sides of the hood 14 converge toward the rear, being appreciably narrow at the rear. This construction also adds to the visibility from the operator's station as well as to the general appearance of the tractor.

As shown by the broken away section of the frame member 26 in Figure 2, said member is formed with a hollow cross-section to provide for a propeller shaft 28, which extends rearwardly from the fly-wheel housing 11 to the rear axle structure 27. Further details of the housing, clutch, transmission, differential and other elements of the driving mechanism have not been shown, as specifically they form no part of the invention and as any conventional construction may be utilized. The rear axle housing structure 27 supports axle shafts 29 on which rear drive wheels 30 are mounted.

An additional frame member 31 is shown rigidly connected to a boss 32 on the fly-wheel housing 11 and to a boss 33 on the rear axle housing structure 27. This frame member is optional, it being understood that the frame member 26 may be made strong enough and rigid enough to take the strains resulting from operation of the tractor, whereby the other side of the tractor would be entirely free from any frame structure. When both frame members are used, it will be noted that the frame structure of the tractor consisting of the crank-case of the engine unit 10, the rearwardly diverging frame members 26 and 31 and the rear axle housing structure 27 form substantially a triangle with the apex of the triangle lying substantially at the center of the front axle 17. This construction gives a balanced weight and a symmetrical appearance when the hood 14 is arranged longitudinally over the angled engine unit.

An operator's station at the rear of the tractor is provided by a seat 34 mounted on a bracket 35 secured to the axle housing structure 27. The steering wheel 25 is located directly in front of the operator's station, as provided for by the seat 34. A brace 36 secured to the frame member 26 extends upwardly and supports the upper end of the steering column 24.

To better illustrate how the tractor, as above described, is utilized for row-crop work, a cultivator attachment has been shown connected to the frame structure of the tractor. Longitudinally extending cultivator beams 37 diverging outwardly at their rear ends are provided with a plurality of shanks 38 on which cultivating shovels 39 are mounted. Adjacent the rear ends of the beams 37, brackets 40 are secured for pivotally connecting on a transverse axis, lifting members 41 and 42. The lifting member 42 extends upwardly and transversely in a horizontal plane through which a bracket 43 is secured to the frame member 26. Said bracket carries a sector 44 which provides means for locking the lifting member 41 in different positions of adjustment. A lifting lever 45 is secured to the outer end of the member 41 beyond the sector 44. Said lifting lever, as best shown in Figure 1, is provided with a detent mechanism 46 for engaging any one of a plurality of notches in the sector 44. The lifting member 42 is rigidly secured to the horizontal portion of the lifting member 41.

At points spaced forwardly from the brackets 40, a second set of brackets 47 are secured to the beams 37. A lifting member 48 is pivoted to one of the brackets 47 extending upwardly and transversely through a pivot bracket 49 mounted on the frame member 26 at a location spaced forwardly from the bracket 43 A lifting member 48' pivotally connected to the other bracket 47 is rigidly secured to the horizontal portion of the lifting member 48.

It will be understood that the lifting members 41 and 48 together with the associated members 42 and 47 form substantially a parallel linkage with the cultivator beams 37 and the frame member 26. As shown in the drawings, the cultivator shovels 39 are engaging the ground in operating position. By releasing the detent mechanism 46 and moving the lever 45 forwardly over the sector 44, the lifting members 41, 42, 48 and 48' are swung rearwardly and upwardly, thereby lifting the beams 37 upwardly and removing the shovels from soil-engaging position.

The cultivating attachment has been merely to illustrate one type of implement which could be applied to a tractor incorporating the invention to take advantage of the increased visibility obtained by the novel frame construction. An operator has complete vision of the row passing under the tractor and is able to see forwardly under the fly-wheel housing to view the plants as they are passed by the front shovels 39. By means of this construction, an operator can follow the rows very closely and is enabled to dodge plants which are not in perfect alinement, for example, when cross-cultivating a check-row planter.

It is to be understood that applicant has shown and described only a preferred embodiment of his improved tractor construction for row-crop operation, and that he claims as his invention all modifications falling within the scope of the appended claims.

What is claimed is:

1. In a row-crop farm tractor having a front axle with spaced wheels mounted thereon and adapted to straddle a plant row, a rear axle structure and spaced wheels mounted thereon adapted to straddle the same plant row, and, in combination therewith, frame structure connected to the front axle adjacent the center thereof and provided with two diverging portions extending angularly rearwardly and connected to the ends of the rear axle structure, a driver's station at the rear of the tractor, said diverging portions and the rear axle defining an open area ahead of the operator's station providing vision from the operator's station of row-crops centrally beneath the tractor, one of said diverging portions being hollow, a power plant on the front of the frame structure, and a drive shaft located in said hollow portion of the frame structure.

2. A motor propelled ground engaging implement comprising a rear axle housing having a differential housing included at one end thereof, a propeller shaft housing secured to the differential housing and extending forwardly in inwardly inclined relation to the axle housing, and implement supporting means carried on the propeller shaft housing and extending laterally therefrom into the space directly forward of the axle housing.

3. A motor propelled ground engaging implement comprising a rear axle housing having a differential housing included at one end thereof, a propeller shaft housing secured to the differential housing and extending forwardly in inwardly inclined relation to the axle housing, ground wheels mounted at the respective ends of the axle housing, implement supporting means carried on the propeller shaft housing, and a ground engaging implement carried by said supporting means having portions symmetrically disposed at opposite sides of a longitudinal vertical plane extending midway between the ground wheels in parallel relation thereto.

4. A tractor comprising a front wheel structure, a transverse rear axle spaced longitudinally from the front wheel structure, said axle and front wheel structure having generally a common longitudinal center line, a body carried at its forward end by the front wheel structure and extending rearwardly therefrom on a generally longitudinal axis disposed in divergent relation to the aforesaid center line, the rear portion of said body being connected to an end portion of the rear axle at a point spaced laterally from the aforesaid center line, an operator's station at the rear of the tractor, said body including at its front end a power plant alined with the generally longitudinal axis of the body and disposed over, and projecting ahead of the front wheel structure, said body being hollow at its rear portion, a drive shaft longitudinally disposed in said hollow portion and connected to the power plant, and a frame member connected at its rear end to the opposite end portion of the rear axle and extending forwardly in converging relation to the aforesaid center line and connected to the body at the rear of the power plant, said frame and body and the rear axle forming an open triangle having an apex substantially at the rear of the power plant and affording, from the opertor's station, vision of the ground directly centrally beneath the tractor.

5. A tractor comprising a front wheel structure, a transverse rear axle spaced longitudinally from the front wheel structure, said axle and front wheel structure having generally a common longitudinal center line, a body carried at its forward end by the front wheel structure and extending rearwardly therefrom on a generally longitudinal axis disposed in divergent relation to the aforesaid center line, the rear portion of said body being connected to an end portion of the rear axle at a point spaced laterally from the aforesaid center line, an operator's station at the rear of the tractor, said body including at its front end a power plant alined with the longitudinal axis of the body and disposed over and projecting ahead of the front wheel structure, said body being hollow at its rear portion, a drive shaft in said hollow portion and connected to the power plant, a frame member connected at its rear end to the opposite end portion of the rear axle and extending forwardly in converging relation to the aforesaid center line and connected to the body at the rear of the power plant, said frame and body forming opposite sides of an open isosceles triangle having the rear axle as a base and its apex substantially at the rear of the power plant and affording, from the operator's station, vision of the ground directly centrally beneath the tractor, and a hood structure carried by the body over the power plant and having a longitudinal axis alined with the aforesaid center line, the rear portion of said hood structure terminating substantially at the aforesaid apex of the open triangle.

ARNOLD E. W. JOHNSON.